United States Patent [19]

Shibaike et al.

[11] Patent Number: 5,013,954
[45] Date of Patent: May 7, 1991

[54] ELECTROSTATIC MICRO-MOTOR APPARATUS

[75] Inventors: Narito Shibaike, Hirakata; Shinji Uchida, Osaka, both of Japan

[73] Assignee: Matsushita Electric Industrial Co., Ltd., Osaka, Japan

[21] Appl. No.: 535,566

[22] Filed: Jun. 11, 1990

[30] Foreign Application Priority Data

Jun. 16, 1989 [JP] Japan .................. 1-155365

[51] Int. Cl.⁵ .................. H02N 1/00; F16H 1/12
[52] U.S. Cl. .................. 310/309; 310/40 MM; 74/421 A
[58] Field of Search .......... 310/309, 42, 90.5, 40 MM, 310/DIG. 6, 83; 74/421 A

[56] References Cited

U.S. PATENT DOCUMENTS

| | | | |
|---|---|---|---|
| 2,702,353 | 2/1955 | Herson et al. | 310/DIG. 6 |
| 3,629,624 | 12/1971 | Staudte | 310/DIG. 6 |
| 4,006,374 | 2/1977 | Nakagawa | 310/156 |
| 4,075,518 | 2/1978 | Koehler et al. | 310/49 R |
| 4,291,248 | 9/1981 | Rainbolt | 310/14 |
| 4,376,991 | 3/1983 | Piaget | 368/37 |
| 4,740,410 | 4/1988 | Muller et al. | 428/133 |
| 4,754,185 | 6/1988 | Gabriel et al. | 310/309 |
| 4,908,808 | 3/1990 | Knapen et al. | 310/40 MM |
| 4,935,655 | 6/1990 | Ebner | 310/40 MM |
| 4,943,750 | 7/1990 | Howe et al. | 310/309 |

OTHER PUBLICATIONS

Hightech, No. 12, Dec. 1988, Wurzburg, DE. pp. 49-51; "Mikromaschinen, Mullers Motor."

*Primary Examiner*—Steven L. Stephan
*Assistant Examiner*—Dennis R. Haszko
*Attorney, Agent, or Firm*—Wenderoth, Lind & Ponack

[57] ABSTRACT

An electrostatic micro-motor apparatus capable of transmitting a driving force of an electrostatic micro-motor comprises a rotor which has the shape of a gear substantially. A plurality of electrodes are disposed at a predetermined circumferential region around the rotor so as to confront the teeth of the rotor, and such that a circumferential gap is defined at the remaining circumferential region around the rotor. A transmission gear is provided in the circumferential gap so as to be brought into engagement with the rotor.

6 Claims, 18 Drawing Sheets

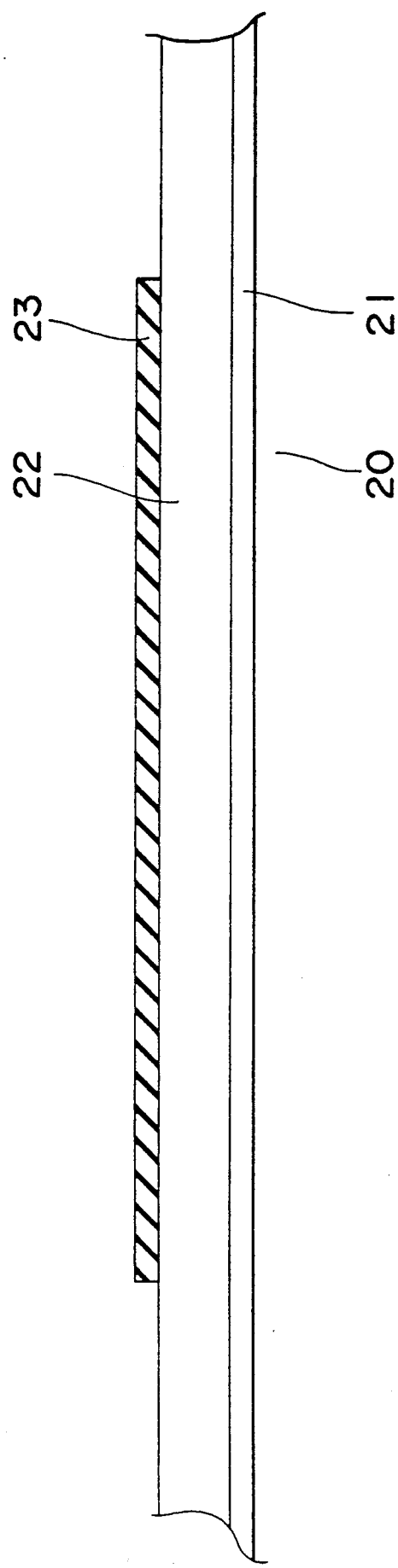

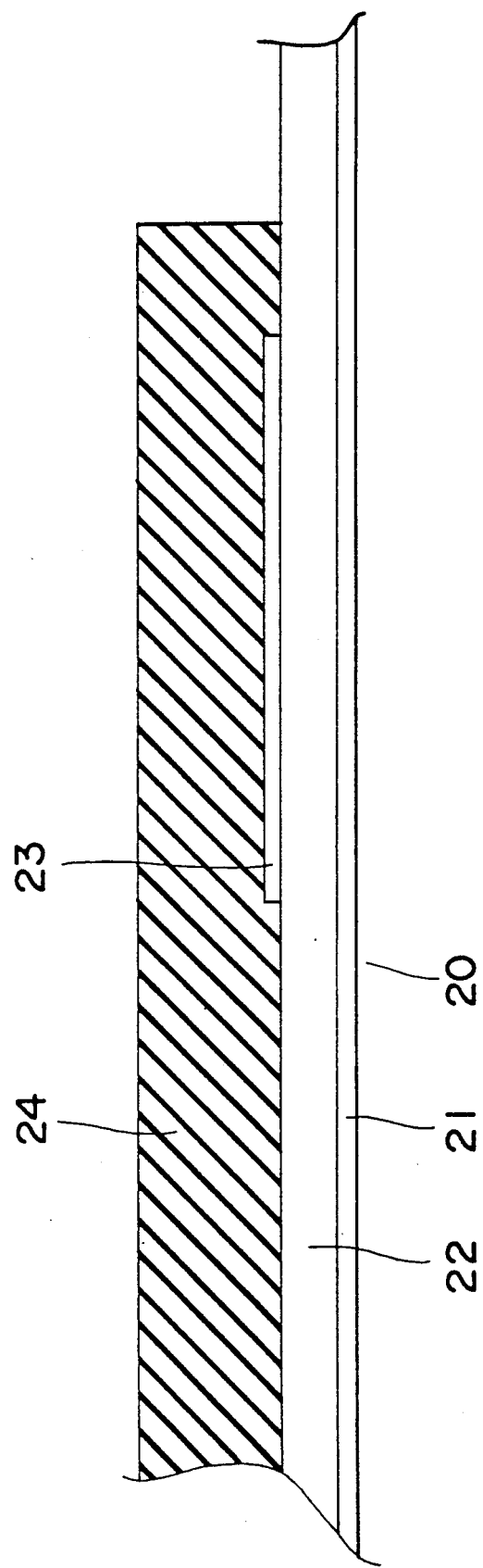

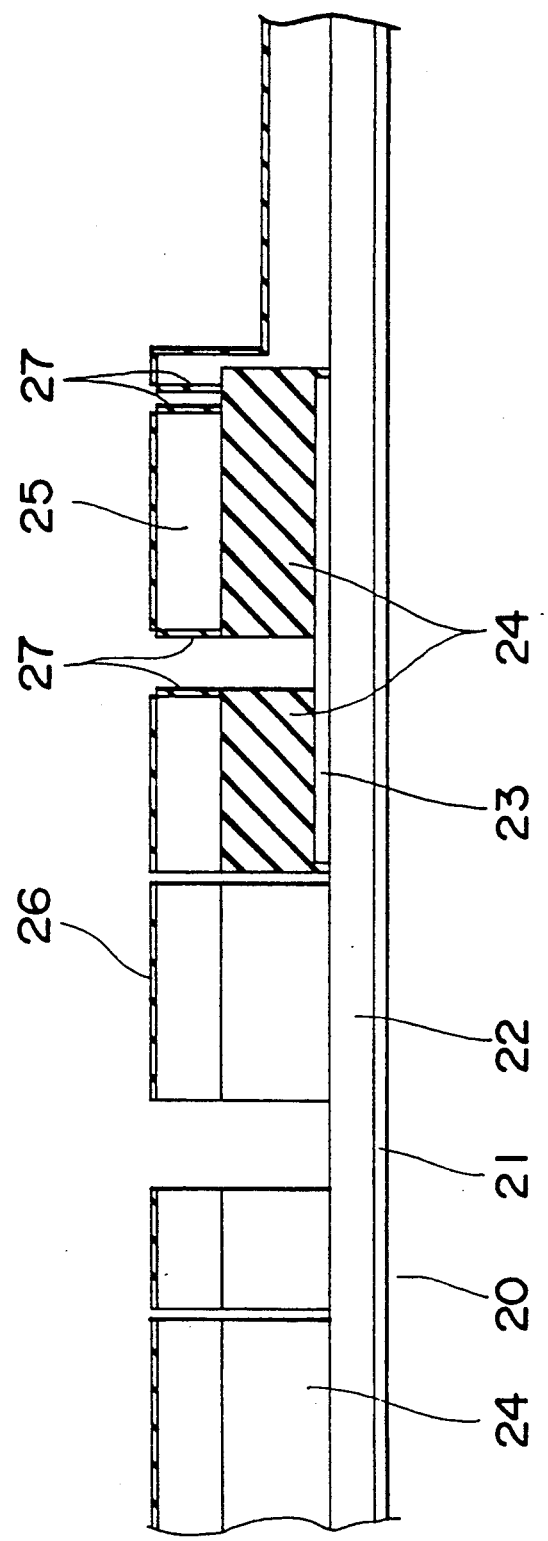

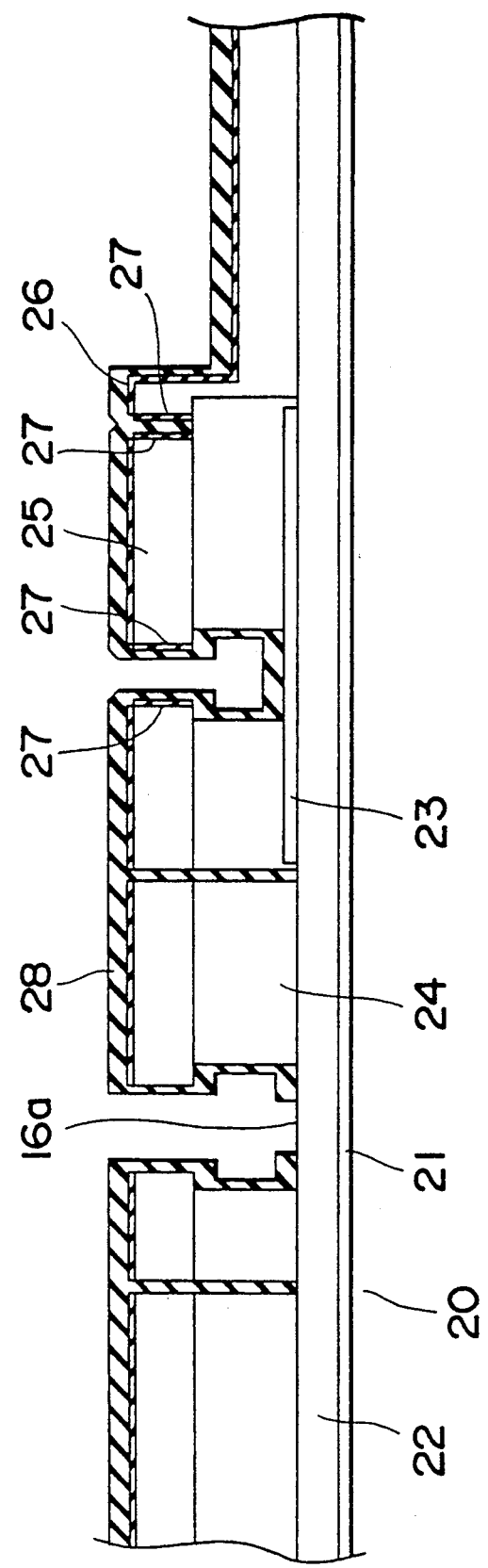
Fig. 5ℓ

# ELECTROSTATIC MICRO-MOTOR APPARATUS

BACKGROUND OF THE INVENTION

The present invention relates to an electrostatic micro-motor apparatus capable of transmitting the driving force of an electrostatic micro-motor acting as a driving source of a micro-machine, which is produced by methods of producing semiconductors, e.g. etching, lithography, etc.

An electrostatic micro-motor apparatus is described in, for example, a paper entitled "IC-Processed Micro-Motors: Design, Technology, and Testing" (Proceedings of IEEE Micro Electro Mechanical Systems Workshop, Feb. 1989) by Tai et al. This known electrostatic micro-motor apparatus is shown in FIGS. 1 and 2 and is produced by methods of producing semiconductors, for example, etching, lithography, etc. As shown in FIG. 1, the known electrostatic micro-motor apparatus includes a support shaft 1, a rotor 2 formed with four cruciform projections having a maximum diameter of 120 $\mu$m and 12 electrodes $3a$-$3l$ provided radially relative to a rotational axis of the rotor 2. Although not specifically shown, the electrodes $3a$-$3l$ are divided into three sets each having four of the electrodes $3a$-$3l$ and the three sets are connected in parallel such that a three-phase four-pole motor is obtained. More concretely, the first set includes the electrodes $3a$, $3d$, $3g$ and $3j$ and the second set includes the electrodes $3b$, $3e$, $3h$ and $3k$, while the third set includes the electrodes $3c$, $3f$, $3i$ and $3l$.

As shown in FIG. 2, the support shaft 1 is placed on a reference layer 4. The rotor 2 is supported between an upper flange $1a$ and a lower flange $1b$ so as to be prevented from coming into contact with the reference layer 4. The electrodes $3a$-$3l$ are so provided as to have a height substantially equal to that of the rotor 2. The rotor 2 has an inner peripheral contact portion $2a$ held in contact with the support shaft 1 and an outer peripheral portion $2b$. The electrodes $3a$-$3l$ have inner peripheral portions $3a'$-$3l'$, respectively as shown in FIG. 1. The support shaft 1, the rotor 2, the electrodes $3a$-$3l$ and the reference layer 4 are made of polycrystalline silicon. A film of silicon nitride ($Si_3N_4$) acting as a lubricating layer is coated on the inner peripheral portion $2a$ and the outer peripheral portion $2b$ of the rotor 2 and the inner peripheral portions $3a'$-$3l'$ of the electrodes $3a$-$3l$.

In the known electrostatic micro-motor apparatus of the above described arrangement, a voltage of about 60 to 400 V is sequentially applied to the three-phase four-pole electrodes $3a$-$3l$ through changeover of the phases. Thus, an electrostatic attractive force is exerted between end portions of the rotor 2 and the electrodes $3a$-$3l$ so as to rotate the rotor 2. For example, when the voltage is sequentially applied to the first set of the electrodes $3a$, $3d$, $3g$ and $3j$, the second set of the electrodes $3b$, $3e$, $3h$ and $3k$ and the third set of the electrodes $3c$, $3f$, $3i$ and $3l$, the rotor 2 is rotated in the direction of the arrow X in FIG. 1.

However, in the known electrostatic micro-motor apparatus, it is possible to rotate the rotor 2 but it is impossible to take out its rotational driving force. Thus, since the known electrostatic micro-motor apparatus has such a construction as an electric motor for general purpose, in which a gear is mounted on a shaft afterwards, it is impossible to effectively apply semiconductor production methods to the known electrostatic micro-motor apparatus in order to mass produce compact and light electrostatic micro-motor apparatuses having high reliability. Therefore, the known electrostatic micro-motor apparatus has such a drawback that it is impossible to formulate a micro-machine employing the known electrostatic micro-motor as its driving source.

SUMMARY OF THE INVENTION

Accordingly, an essential object of the present invention is to provide a novel electrostatic micro-motor apparatus which is capable of transmitting a driving force of an electrostatic micro-motor such that the electrostatic micro-motor acts as a driving source of a micro-machine.

In order to accomplish this object of the present invention, an electrostatic micro-motor apparatus according to the present invention comprises: a rotor which has the shape of a gear, substantially; a plurality of electrodes which are disposed at a predetermined circumferential region around the rotor so as to confront teeth of the rotor such that a circumferential gap is defined at the remaining circumferential region around the rotor; and a transmission gear which is provided in the circumferential gap so as to be brought into engagement with the rotor.

In the above described arrangement of the present invention, the rotating rotor itself acts as a gear and the transmission gear is disposed at the region where the electrodes are not provided. Therefore, since the rotor and the transmission gear can be brought into direct engagement with each other, rotational driving force of the rotor can be taken out externally through the transmission gear.

Meanwhile, since each component is formed into a planar shape, the electrostatic micro-motor apparatus can be easily produced by methods of producing semiconductors. Therefore, the electrostatic micro-motor apparatus can be made compact, light and highly reliable through mass production so as to transmit driving force of the electrostatic micro-motor such that the electrostatic micro-motor acts as a driving source for a micro-machine.

BRIEF DESCRIPTION OF THE DRAWINGS

This object and features of the present invention will become apparent from the following description taken in conjunction with the preferred embodiment thereof with reference to the accompanying drawings, in which.

Figure 1:
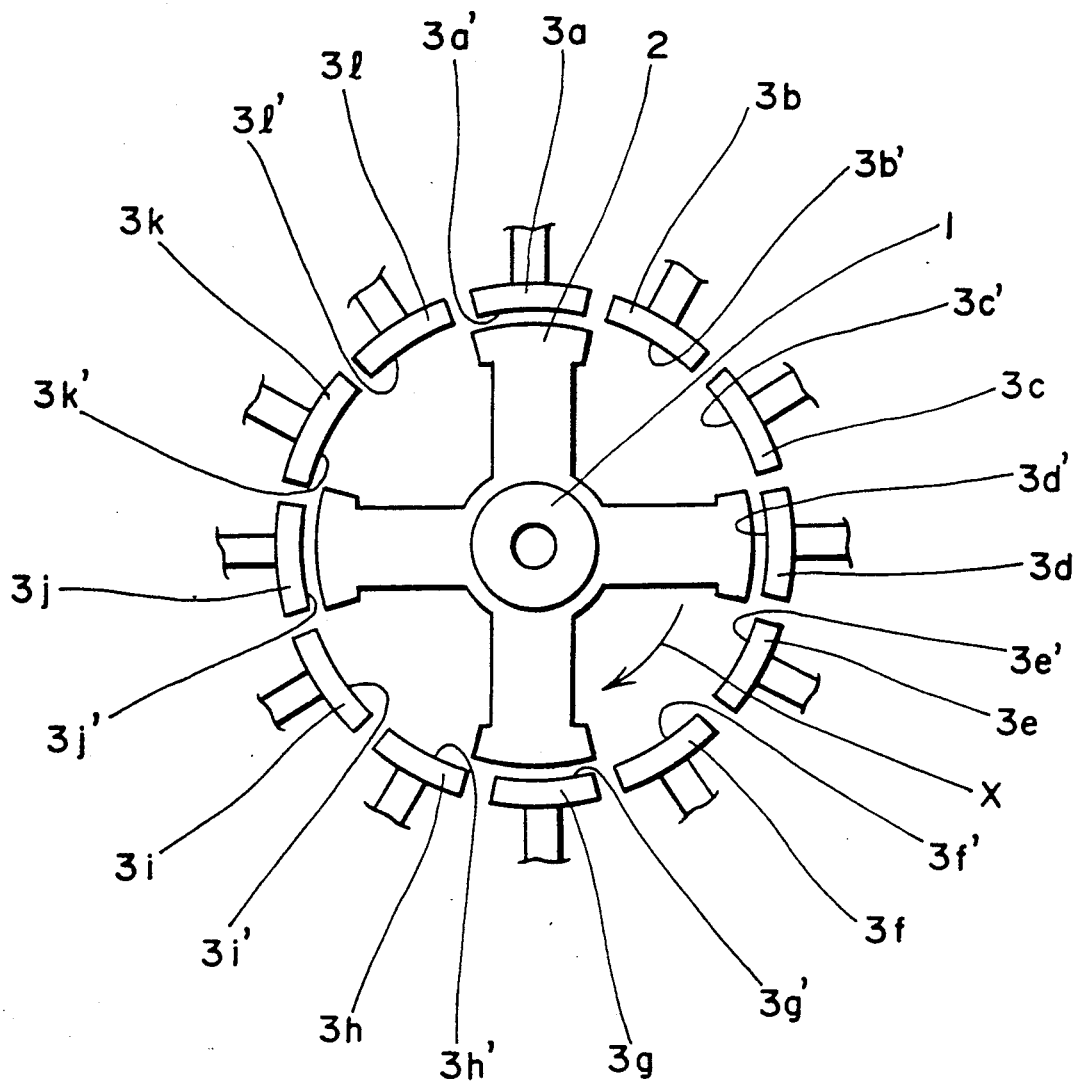
FIG. 1 is a top plan view of a prior art electrostatic micro-motor apparatus (already referred to)
Figure 2:
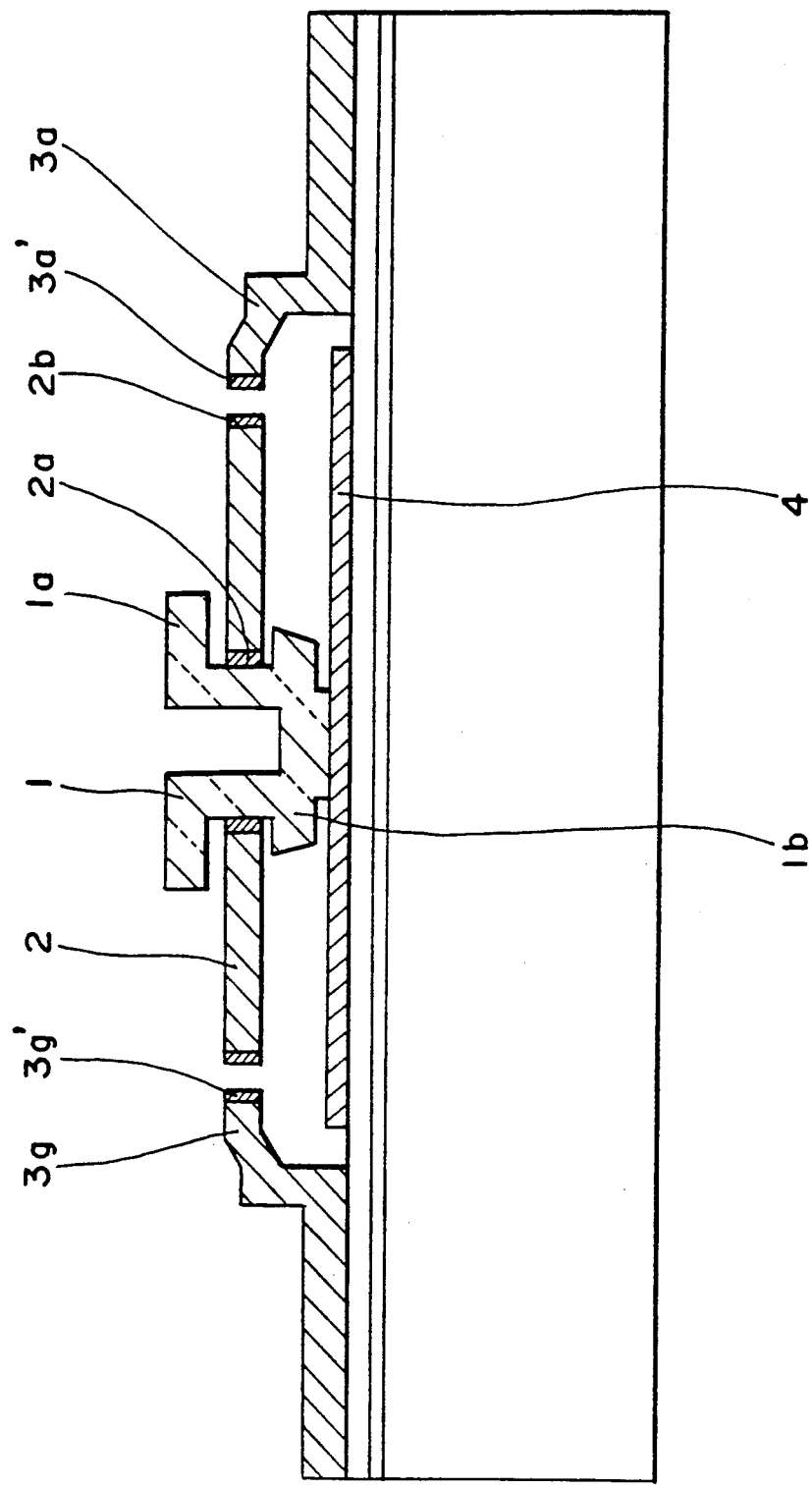
FIG. 2 is a sectional view of the prior art electrostatic micro-motor apparatus of FIG. 1 (already referred to)
Figure 3:
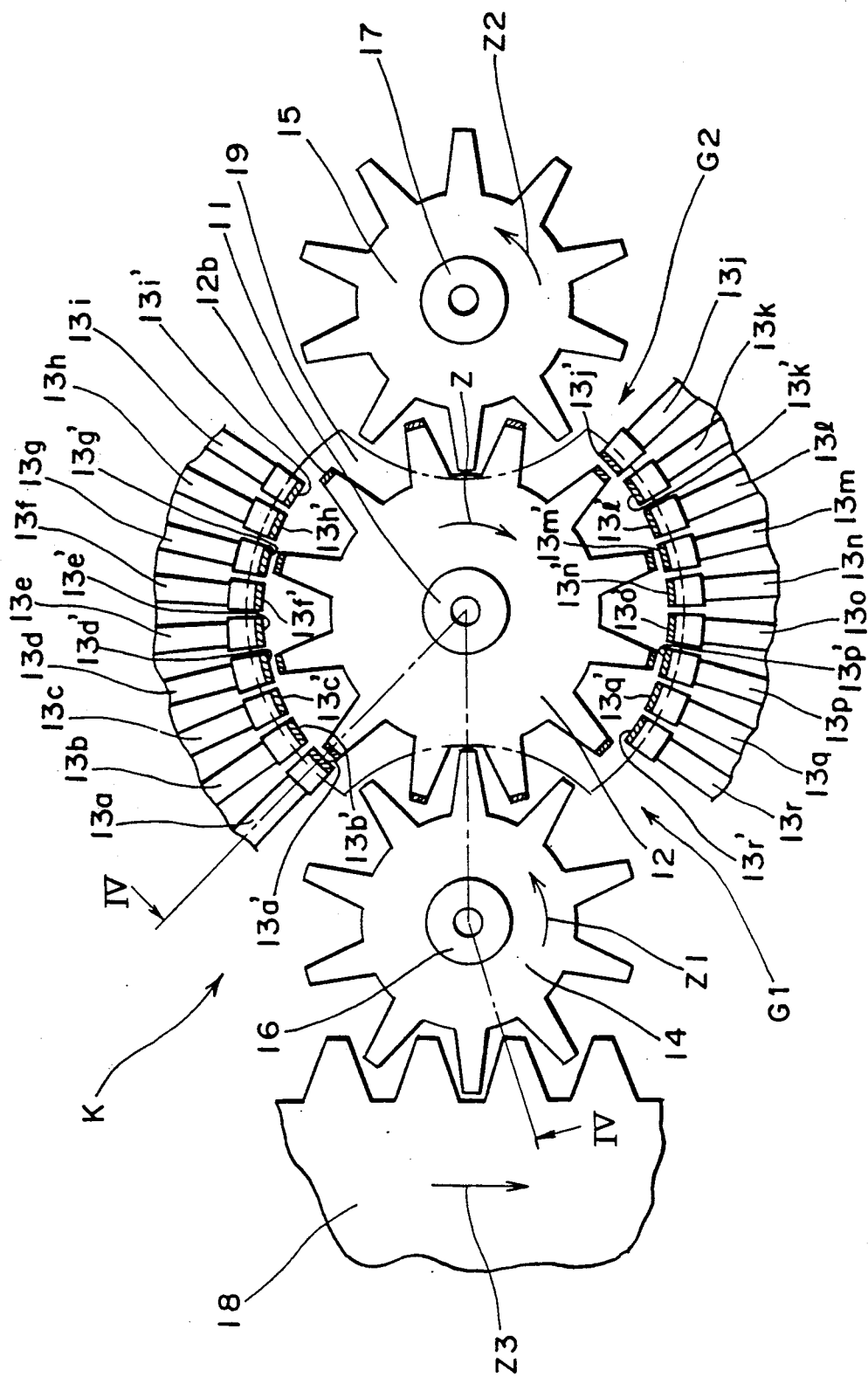
FIG. 3 is a top plan view of an electrostatic micro-motor apparatus according to one embodiment of the present invention.

FIGS. $5a$ to $5n$ are views explanatory of production processes of the apparatus of FIG. 3.

Before the description of the present invention proceeds, it is to be noted that like parts are designated by like reference numerals throughout several views of the accompanying drawings.

DETAILED DESCRIPTION OF THE INVENTION

Referring now to the drawings, there is shown in FIG. 3, an electrostatic micro-motor apparatus K capable of transmitting the driving force of an electrostatic micro-motor, according to one embodiment of the present invention. The apparatus K includes a support shaft 11, a rotor 12 having a shape of a gear, substantially, an outside diameter of 120 $\mu$m and 18 electrodes 13a–13r. The rotor 12 has 12 teeth. The electrodes 13a–13i spaced a predetermined interval from each other and the electrodes 13j–13r spaced the predetermined interval from each other are provided radially and symmetrically with respect to a rotational axis of the rotor 12 so as to confront each other. Although not specifically shown, the electrodes 13a–13r are divided into three sets each having six of the electrodes 13a–13r, and the three sets are connected in parallel such that a three-phase six-pole motor is obtained. More concretely, the first set includes the electrodes 13a, 13d, 13g, 13j, 13m and 13p and the second set includes the electrodes 13b, 13e, 13h, 13k, 13n and 13q, while the third set includes the electrodes 13c, 13f, 13i, 13l, 13o and 13r. Since the electrodes 13a–13i and the electrodes 13j–13r are, respectively, provided at opposite small circumferential regions around the rotor 12 such that the electrodes 13a and 13i are, respectively, spaced far away from the electrodes 13r and 13j, opposite large circumferential gaps G1 and G2 are, respectively, defined between the electrodes 13a and 13r and between the electrodes 13i and 13j.

Figure 4:
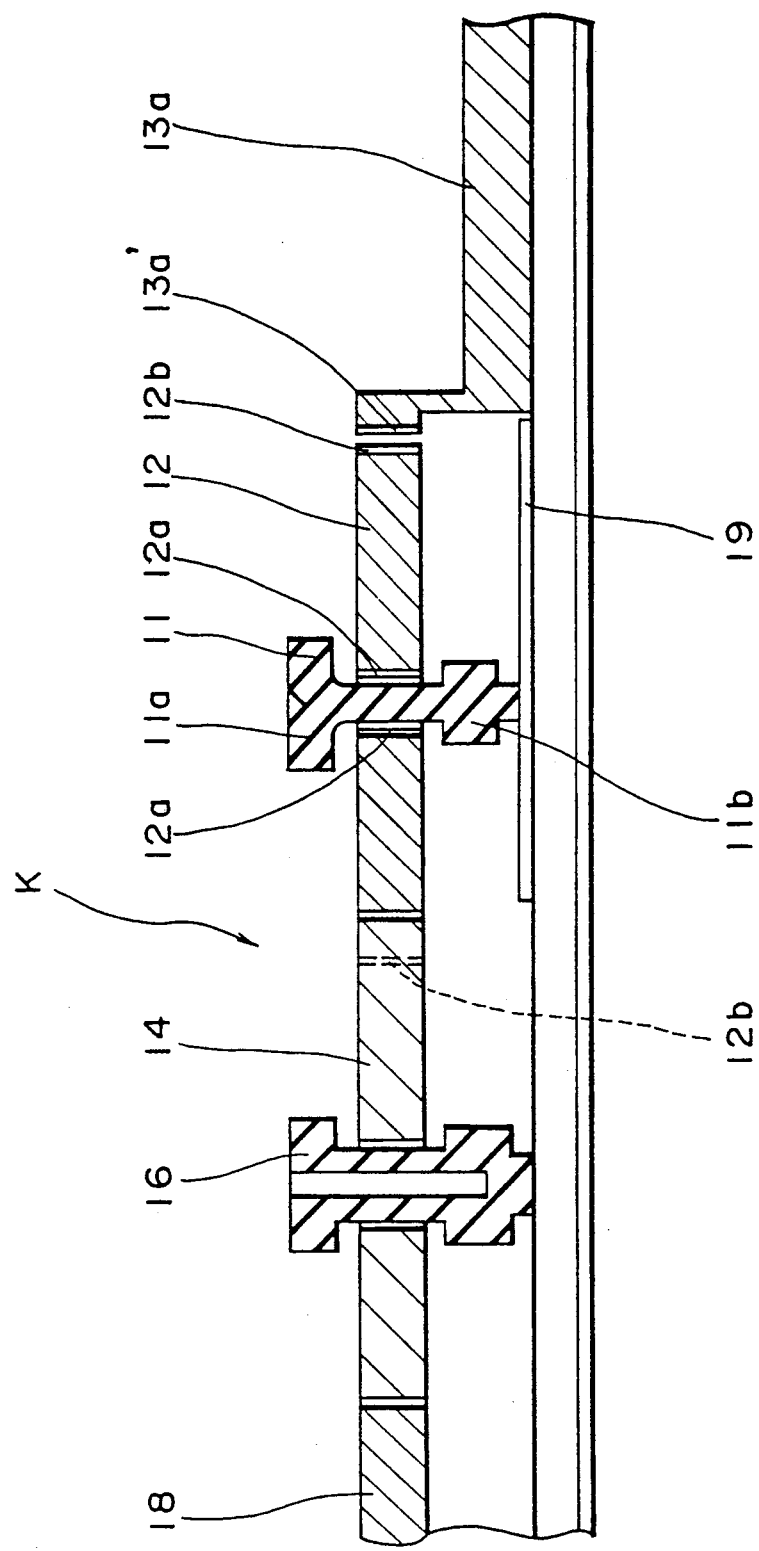
FIG. 4 is a sectional view taken along the line IV—IV in FIG. 3.

The apparatus K further includes transmission gears 14 and 15 each having 10 teeth. Therefore, the number of teeth (10) of each of the transmission gears 14 and 15 is less than the number of teeth (12) of the rotor 12. The transmission gears 14 and 15 are, respectively, provided in the circumferential gap G1 between the electrodes 13a and 13r and the circumferential gap G2 between the electrodes 13i and 13j so as to be brought into engagement with the rotor 12. The transmission gears 14 and 15 are, respectively, supported by support shafts 16 and 17. A rack 18 is brought into engagement with the transmission gear 14. As shown in FIG. 4, the support shaft 11 is placed on a reference layer 19.

As is seen from FIG. 4, the rotor 12 is supported between upper and lower flanges 11a and 11b of the support shaft 11 so as to be prevented from coming into contact with the reference layer 19. The electrodes 13a–13r, the rotor 12, the transmission gears 14 and 15 and the rack 18 are set at a substantially identical height, although the transmission gear 15 is not shown. As is clear from FIG. 4, each of the transmission gears 14 and 15 is supported between upper and lower flanges of each of the support shafts 16 and 17 in the same manner as the rotor 12, although the transmission gear 15 is not shown. Although not specifically shown, the rack 18 is also likewise supported. The rotor 12 has an inner peripheral contact portion 12a coming into contact with the support shaft 11 and an outer peripheral portion 12b. Meanwhile, the electrodes 13a–13r have inner peripheral portions 13a'–13r', respectively.

The support shaft 11, the rotor 12, the electrodes 13a–13r, the transmission gears 14 and 15, the support shafts 16 and 17, the rack 18 and the reference layer 19 are made of polycrystalline silicon. A film of silicon nitride ($Si_3N_4$) acting as a lubricating layer is coated on the inner peripheral portion 12a and the outer peripheral portion 12b of the rotor 12 and the inner peripheral portions 13a'–13r' the electrodes 13a–13r.

The electrodes 13a–13i are arranged at an interval of a central angle of 10° and the electrodes 13j–13r are also arranged at an interval of a central angle of 10°. Therefore, the electrodes 13a and 13i forms a central angle of 80°, while the electrodes 13j and 13r also forms a central angle of 80°. Thus, the circumferential gaps G1 and G2 are disposed symmetrically with respect to the rotational axis of the rotor 12. Meanwhile, since the rotor 12 has 12 teeth as described above, the teeth of the rotor 12 are arranged at an interval of a central angle of 30°. Therefore, the central angle of 30° of the teeth of the rotor 12 is a product of the central angle of 10° of the electrodes 13a–13r by a natural number of 3.

Operation of the apparatus K of the above described arrangement is described, hereinbelow. A voltage of about 60 to 400 V is sequentially applied to the three-phase six-pole electrodes 13a–13r through changeover of the phases. An electrostatic attractive force is exerted between end portions of the rotor 12 and the electrodes 13a–13r so as to rotate the rotor 12. For example, when the voltage is sequentially applied to the first set of the electrodes 13a, 13d, 13g, 13j, 13m and 13p, the second set of the electrodes 13b, 13e, 13h, 13k, 13n and 13q and the third set of the electrodes 13c, 13f, 13i, 13l, 13o and 13r, the rotor 12 is rotated in the direction of the arrow Z. Thus, the transmission gears 14 and 15 are, respectively, rotated in the directions of the arrows Z1 and Z2. As a result, the rack 18 is displaced in the direction of the arrow Z3. By utilizing this displacement of the rack 18, a desired mechanism can be formulated.

At this time, since the electrodes 13a–13i and the electrodes 13j–13r are provided radially and symmetrically relative to the rotational axis of the rotor 12, such an undesirable phenomenon does not take place that the rotor 12 is biased relative to the support shaft 11 by the electrostatic attractive force. Meanwhile, since the transmission gears 14 and 15 are also provided symmetrically with respect to the rotational axis of the rotor 12, a load is substantially uniformly applied to the rotor 12 such that the rotor 12 is rotated smoothly.

Figure 5A:
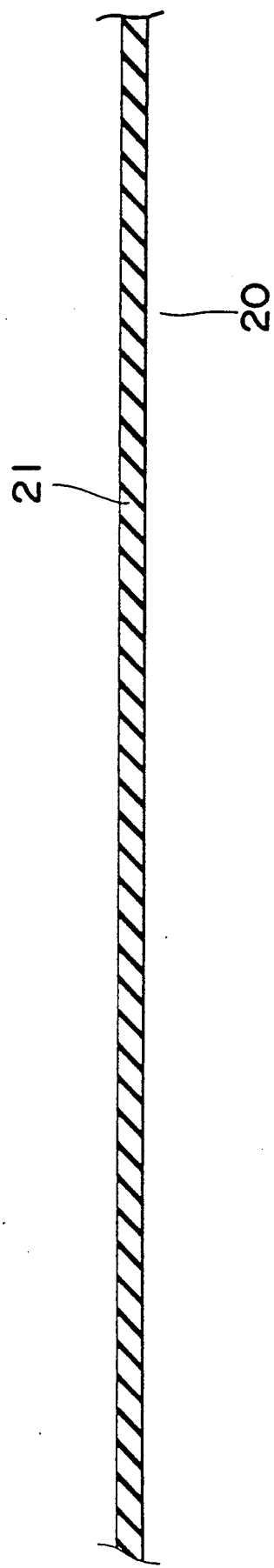

Hereinbelow, a production method of the apparatus K is described with reference to FIGS. 5a to 5n. Since the production method employs an ordinary known method of semiconductors, detailed description of the respective techniques is abbreviated for the sake of brevity and only production processes are described. In FIG. 5a, initially, an oxide film (hatched portion) 21 of silicon dioxide ($SiO_2$) is grown on a substrate 20 of single-crystal silicon to a thickness of 0.3 $\mu$m. The oxide film 21 may be replaced by an LPCVD (low pressure chemical vapor deposition)/PSG (phosphorus-doped silicon glass) layer containing 8 wt. % phosphorus and deposited at about 450° C. to a thickness of 0.3 $\mu$m. The substrate 20 is washed and dried by a predetermined method.

Figure 5B:
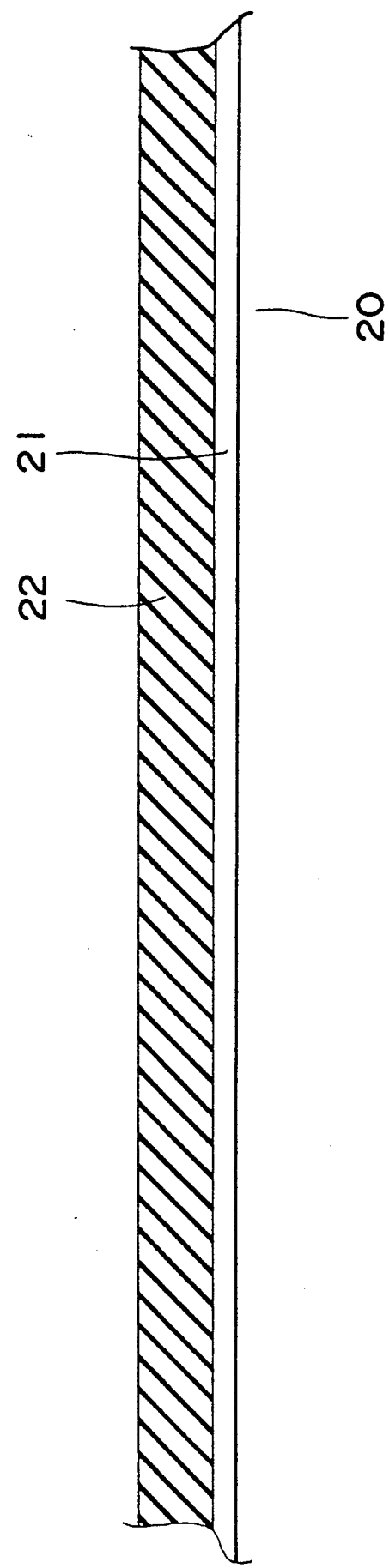

Then, in FIG. 5b, a film (hatched portion) 22 of silicon nitride ($So_3N_4$) is deposited on the oxide layer (or the PSG layer) 21. The oxide layer (or the PSG layer) 21 and the film 22 of silicon nitride constitute an insulating layer after formulation of the motor so as to have a dielectric strength of not less than 500 V. The film 22 of silicon nitride protects the oxide film (or the PSG layer) 21 at the time of dissolution of the oxide film (or the PSG layer) 21 by buffer hydrofluoric acid in the final production process. Subsequently, the substrate 20 is washed and dried.

In FIG. 5c, an LPCVD layer (hatched portion) 23 of polycrystalline silicon is deposited on the film 22 of silicon nitride to a thickness of 0.3 μm at about 610° to 630° C. and then, patterning is performed by photolithography as shown. Patterning is further performed by plasma etching such that the mask is removed by photoresist stripping employing oxygen plasma. At this time, annealing is performed so as to relieve residual stress. This layer 23 of polycrystalline silicon is the reference layer 19 so as to act as an electrostatic shield after formulation of the motor. Thereafter, the substrate 20 is washed and dried. Electric conductivity can be imparted to the layer 23 of polycrystalline silicon as necessary by diffusing phosphorus therein.

In FIG. 5d, an LPCVD/PSG layer (hatched portion) 24 containing 8 wt. % phosphorus is deposited on the layer 22 of silicon nitride to a thickness of 2.2 μm at about 450° C. and etching is performed as shown by dissolving the oxide with buffer hydrofluoric acid. Then, the mask is removed by utilizing photoresist stripping employing oxygen plasma. Subsequently, the substrate 20 is washed and dried.

Figure 5E:
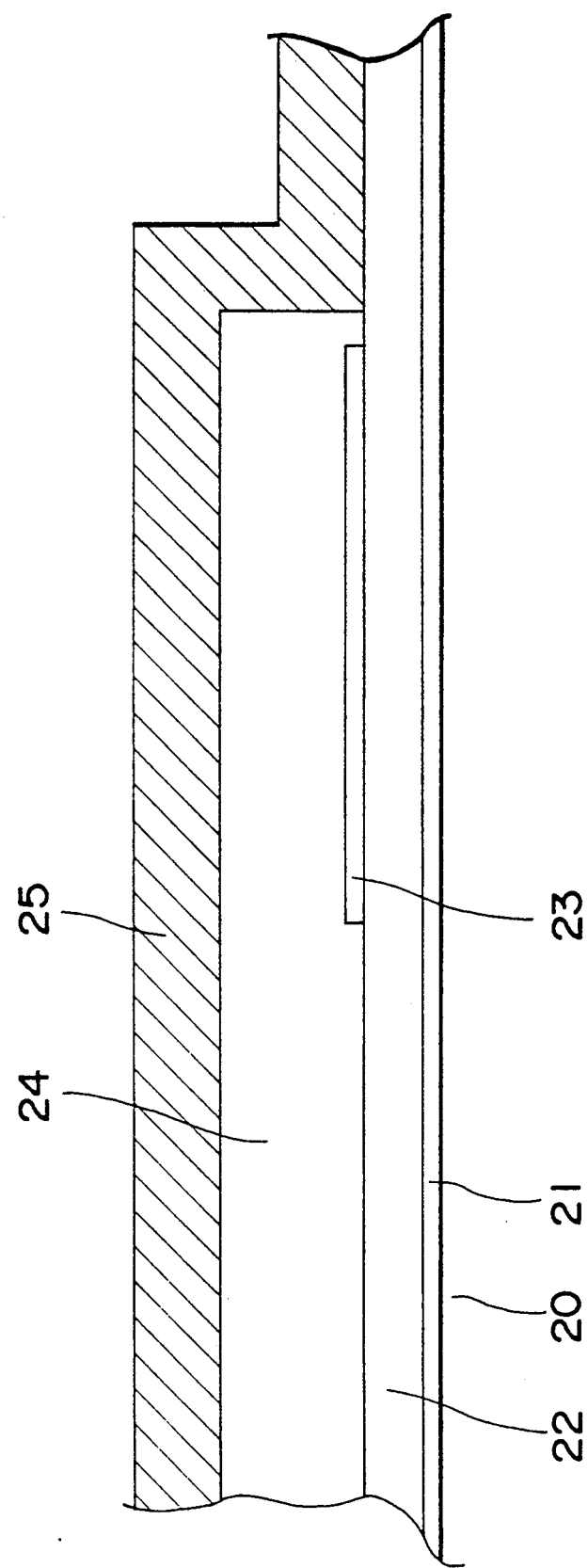

In FIG. 5e, an LPCVD layer (hatched portion) 25 of polycrystalline silicon is wholly deposited on the LPCVD/PSG layer 24 and the layer 22 of silicon nitride to a thickness of 1.5 μm at about 610° to 630° C. This layer 25 of polycrystalline silicon constitutes the rotor 12, the electrodes 13a to 13r, the transmission gears 14 and 15 and the rack 18 as shown in FIGS. 3 and 4. In order to relieve residual stress, annealing is performed at this time. Meanwhile, electric conductivity can be imparted to the layer 25 of polycrystalline silicon as necessary by diffusing phosphorus therein.

Figure 5F:
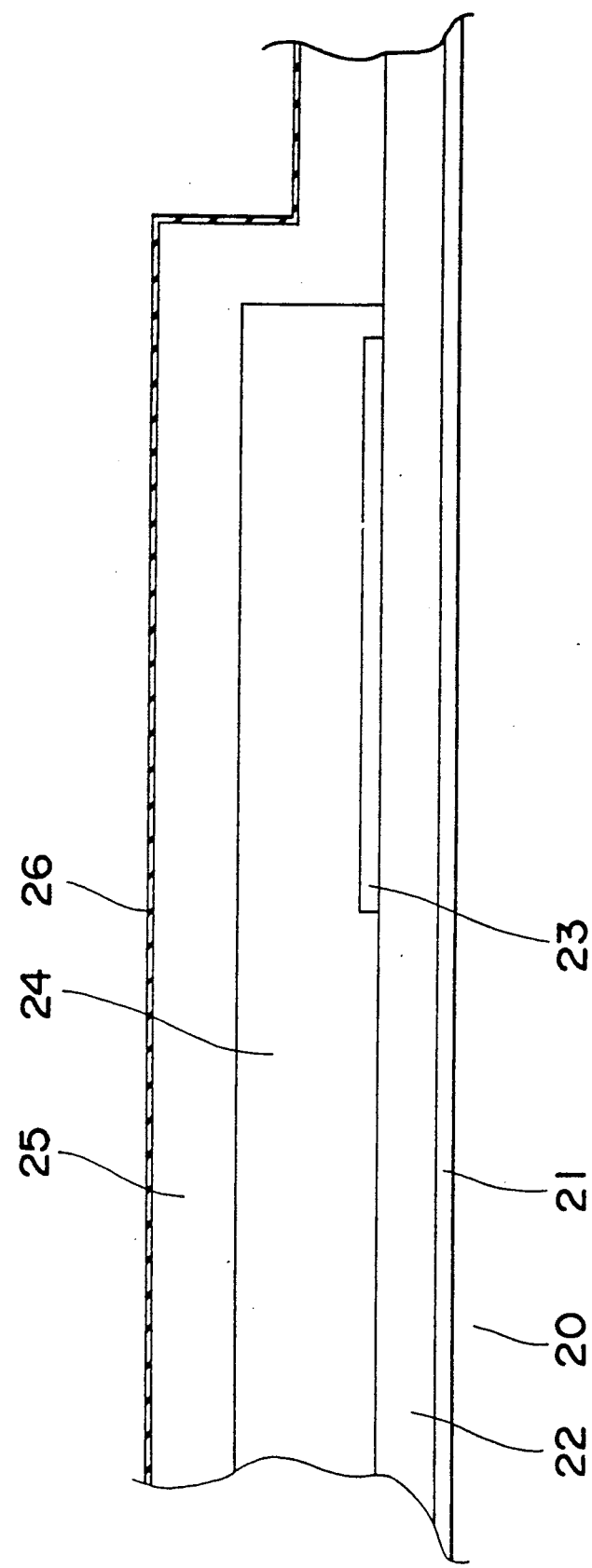

Subsequently, in FIG. 5f, a thermal oxide film (hatched portion) 26 is grown on the layer 25 of polycrystalline silicon to a thickness of 0.1 μm. The thermal oxide film 26 may be replaced by an LPCVD/PSG layer containing 8 wt. % phosphorus and deposited at about 450° C. to a thickness of 0.1 μm. The thermal oxide film (or the PSG layer) 26 acts as a protective film at the time of RIE (reactive ion etching) to be performed subsequently.

Figure 5G:
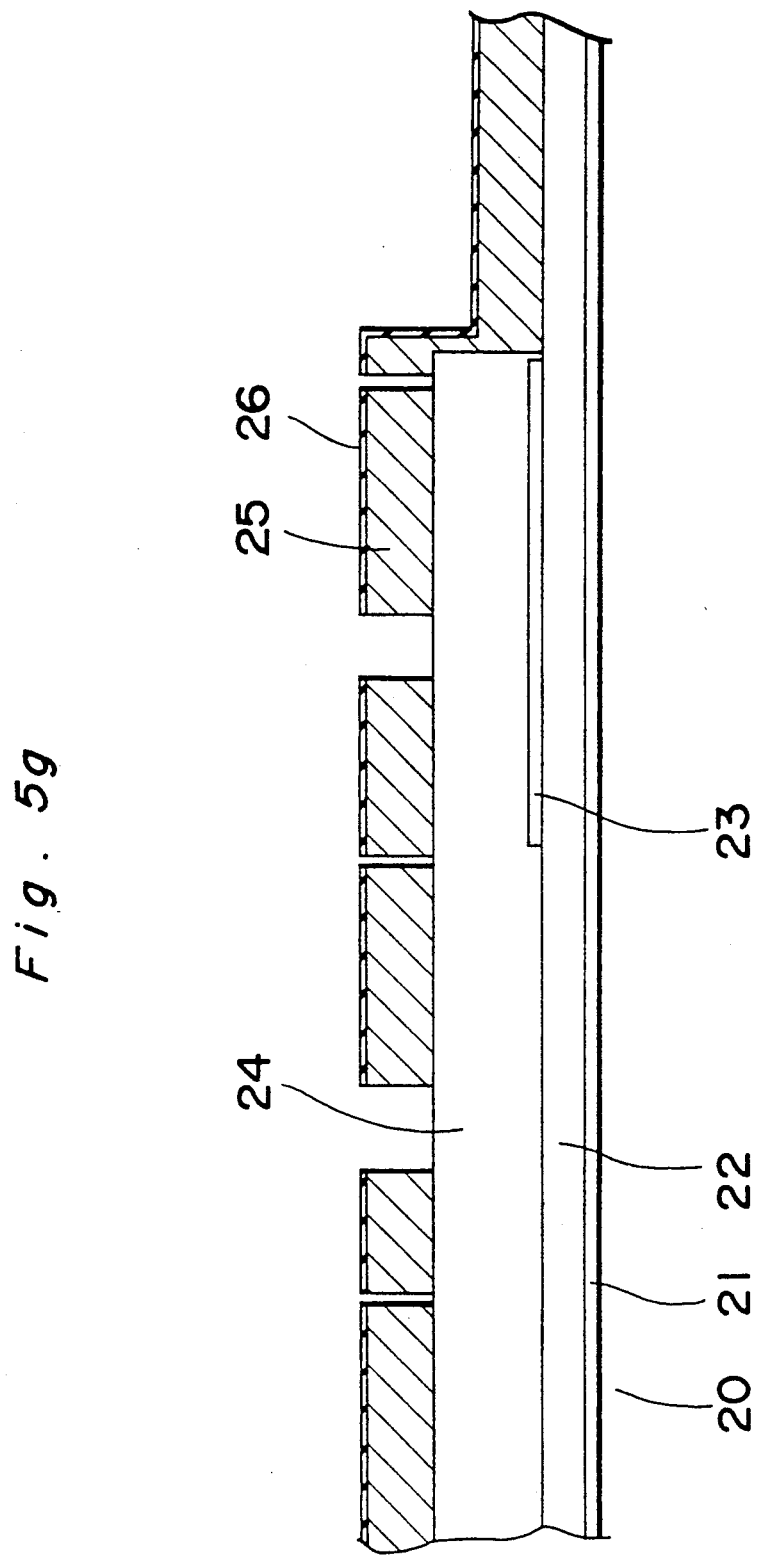

In FIG. 5g, the layer 25 of polycrystalline silicon and the thermal oxide film (or the PSG layer) 26 are subjected to patterning by plasma etching as shown such that contours of the rotor 12 having a shape of a gear substantially, the electrodes 13a–13r provided at the predetermined positions, the transmission gears 14 and 15 and the rack 18 are formed. An end point is detected by performing etching 30% over a necessary level. The mask is removed by photoresist stripping employing oxygen plasma. Subsequently, the substrate 20 is washed and dried and then, annealing is performed so as to relieve residual stress.

Figure 5H:
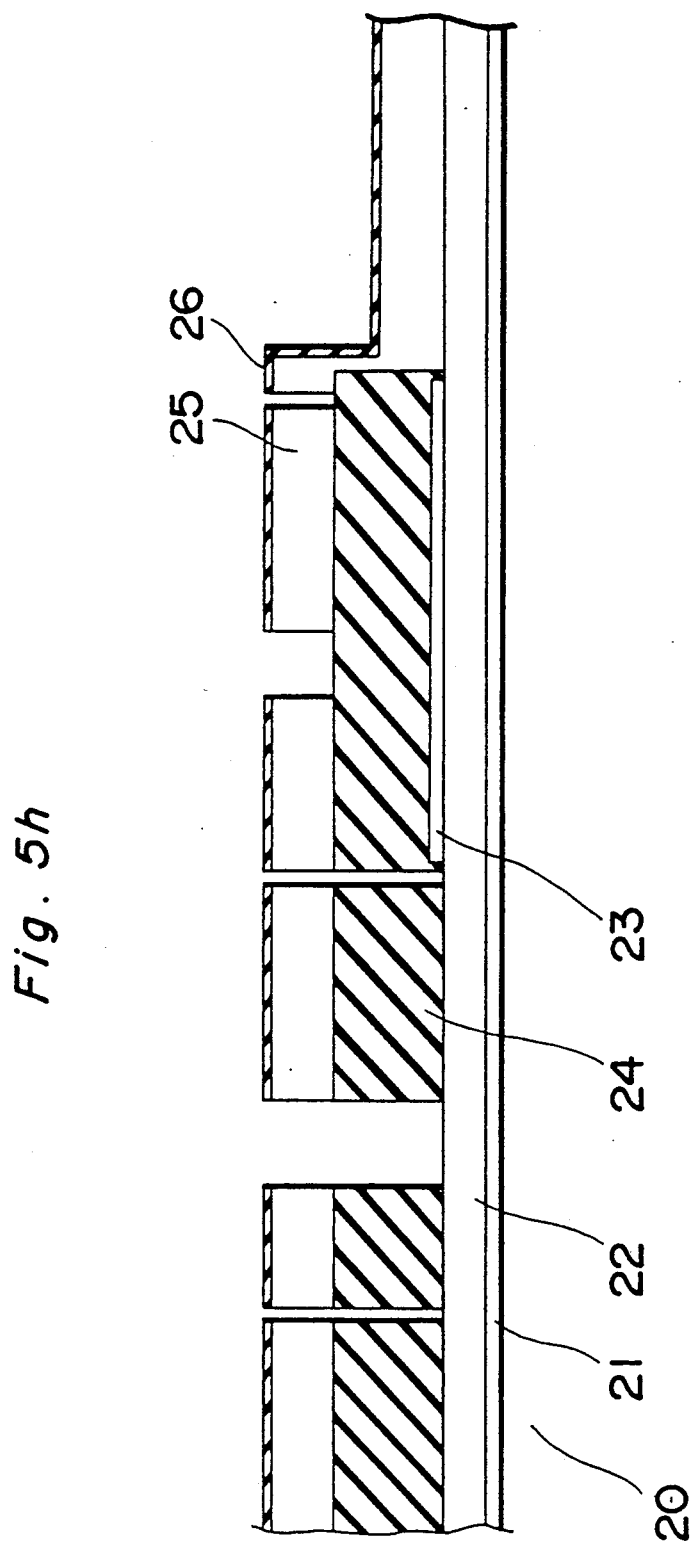

In FIG. 5h, the PSG layer (hatched portion) 24 is etched by dissolving the oxide with buffer hydrofluoric acid. The mask is removed by photoresist stripping employing oxygen plasma. Then, the substrate 20 is washed and dried.

Figure 5I:
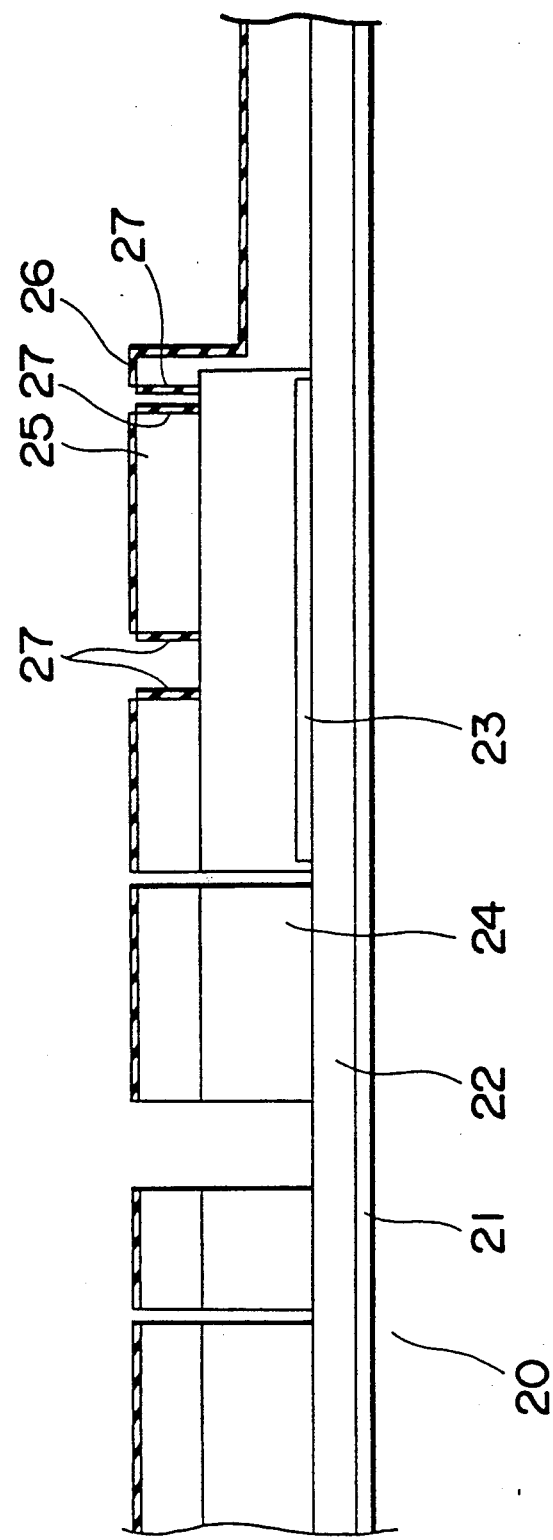

Subsequently, in FIG. 5i, a layer (hatched portion) 27 of silicon nitride is deposited on the layer 25 of polycrystalline silicon. Patterning is performed by RIE. The layer 27 of silicon nitride constitutes the lubricating layers for lessening friction between the rotor 12 and the electrodes 13a–13r and between the rotor 12 and the support shaft 11 to be formed later as shown in FIGS. 3 and 4 at the time of completion of formulation of the motor or compensating for fragility of the materials. The mask is removed by photoresist stripping employing oxygen plasma. Then, the substrate 20 is washed and dried.

In FIG. 5j, the PSG layer (hatched portion) 24 is perforated as shown by plasma etching. An end point is detected by etching 30% over a necessary level. The mask is removed by photoresist etching employing oxygen plasma. Then, the substrate 20 is washed and dried.

Figure 5K:
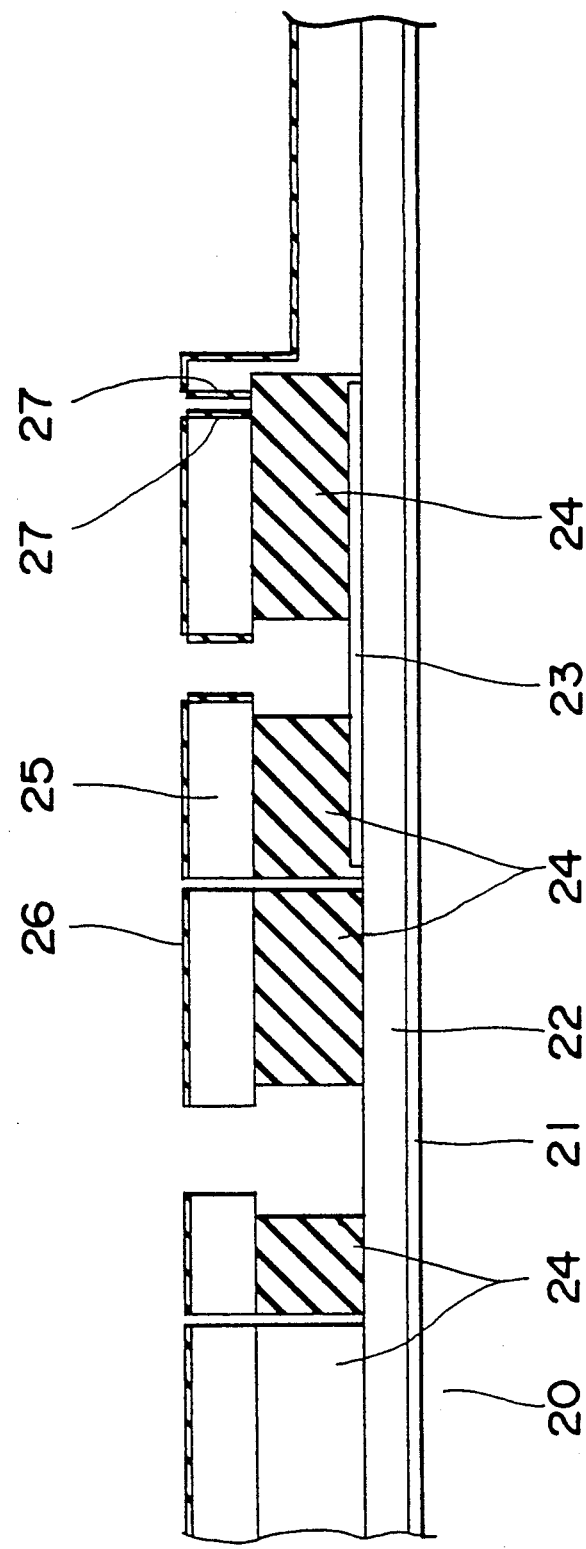

In FIG. 5k, the PSG layer 24 is subjected to undercut etching by photo-lithography. Undercut etching of about 2 μm is performed 50% over a necessary level by dissolving the oxide with buffer hydrofluoric acid through control of time. By this undercut, the lower flange 11b of the support shaft 11 to be formed later is prepared. The mask is removed by photoresist stripping employing oxygen plasma. Then, the substrate 20 is washed and dried.

Then, in FIG. 5l, an LPCVD/PSG layer (hatched portion) 28 containing 8 wt. % phosphorus is deposited on the thermal oxide film (or the PSG layer) 26 at 450° C. to a thickness of 0.5 μm. Then, etching is performed as shown by dissolving the oxide with buffer hydrofluoric acid. By this etching, a hole 16a for securing the support shaft 16 of the transmission gear 14 to the layer 22 of silicon nitride is formed. Although not specifically shown, a hole for securing the support shaft 17 of the transmission gear 15 to the layer 22 of silicon nitride is also formed similarly. The mask is removed by photoresist stripping employing oxygen plasma. Then, the substrate 20 is washed and dried.

Figure 5M:
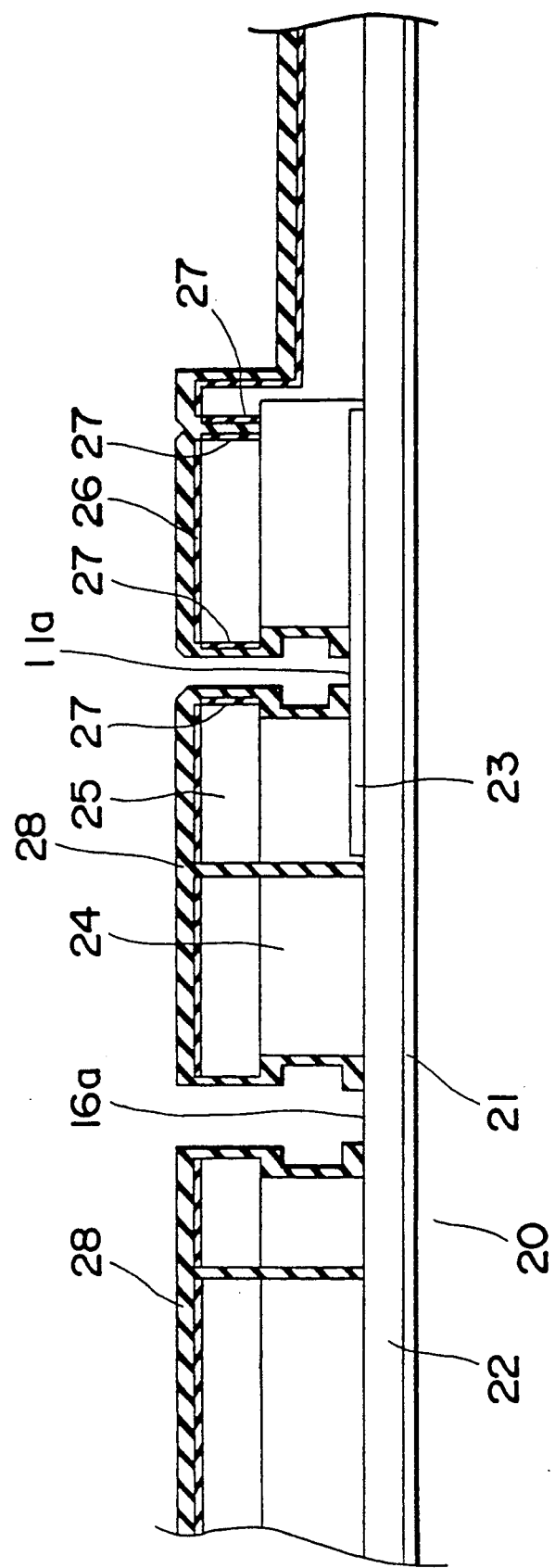

In FIG. 5m, a hole 11a is formed in the PSG layer (hatched portion) 28 by plasma etching. By this hole 11a, the support shaft 11 to be formed later can be secured to the reference layer 19. An end point can be detected by etching 30% over a necessary level. The mask is removed by photoresist stripping employing oxygen plasma. Then, the substrate 20 is washed and dried.

Figure 5N:
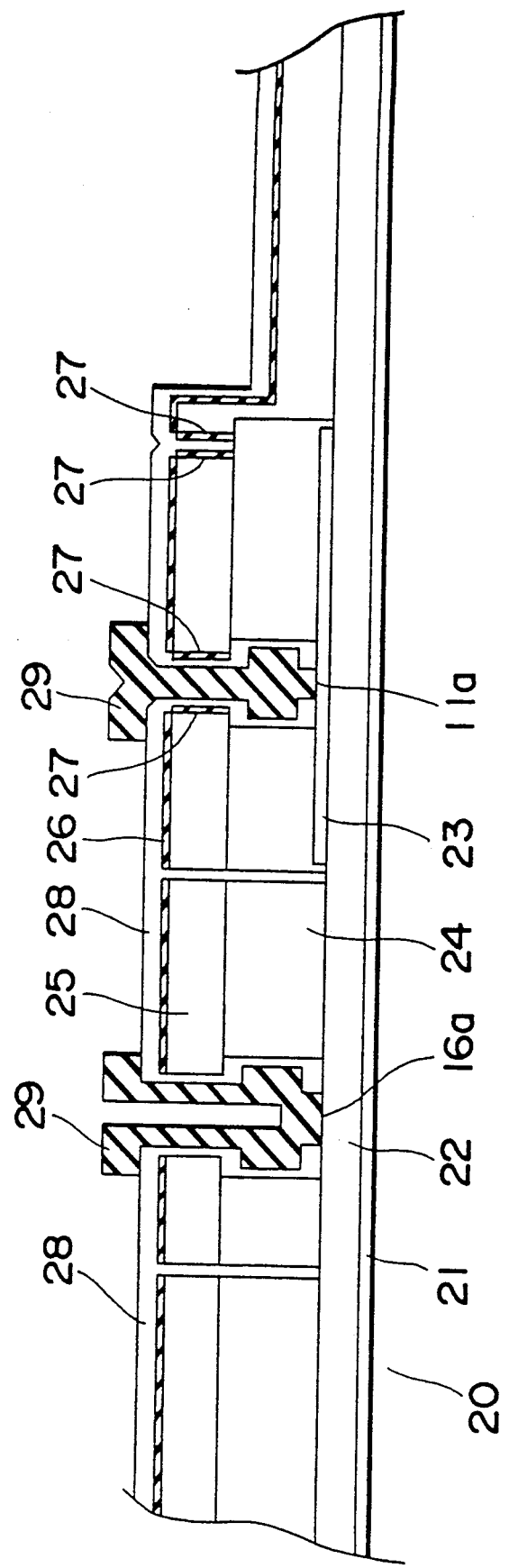

In FIG. 5n, a layer (hatched portion) 29 of LPCVD polycrystalline silicon is deposited at about 610° to 630° C. to a thickness of 1 μm in the hole 11a for the support shaft 11, the hole 16a for the support shaft 16a and the hole (not shown) for the support shaft 17. Then, the support shafts 11, 16 and 17 are formed by plasma etching as shown in FIGS. 3 and 4. The mask is removed by photoresist etching employing oxygen plasma. Subsequently, the substrate 20 is washed and dried. Furthermore, annealing is performed in order to relieve residual stress. Meanwhile, electric conductivity can be imparted to the layer 29 of polycrystalline silicon as necessary by diffusing phosphorus therein.

Finally, the PSG layers (or the oxide films) 24, 26 and 28 are dissolved by buffer hydrofluoric acid such that the movable members of polycrystalline silicon are formed, whereby the arrangement of FIGS. 3 and 4 is obtained.

As described above, the apparatus K of the present invention includes the rotor 12 having a shape of a gear substantially, the electrodes 13a–13r and the transmission gear 14 engageable with the rotor 12. The electrodes 13a–13i and the electrodes 13j–13r are provided radially and symmetrically with respect to the rotational axis of the rotor 12 so as to confront the teeth of the rotor 12 such that the opposite large circumferential gaps G1 and G2 are defined between the electrodes 13a and 13r and between the electrodes 13i and 13j, respectively, while the transmission gear 14 is provided in the circumferential gap G1 between the electrodes 13a and 13r.

Therefore, in the present invention, since the rotor 12 and the transmission gear 14 are brought into direct engagement with each other, rotational driving force of the rotor 12 can be taken out externally with ease. Furthermore, as will be seen from the drawings, each component is formed into a rather planar shape, the apparatus can be easily produced by the methods of producing semiconductors.

Meanwhile, in the above embodiment, the rack 18 is employed for outputting rotational driving force of the rotor 12. However, the rack 18 can also be replaced by an ordinary gear. Moreover, a speed reduction mechanism, etc. may also be further provided in the apparatus.

As is clear from the foregoing, in accordance with the electrostatic micro-motor apparatus of the present invention, driving force of the electrostatic micro-motor can be transmitted such that the electrostatic micro-motor acts as a driving source of a micro-machine. Furthermore, since the apparatus is formed into the rather planar configuration, the apparatus can be produced by the methods of producing semiconductors, so that the compact and light apparatus having high reliability can be mass produced.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An electrostatic micro-motor apparatus capable of transmitting driving force of an electrostatic micro-motor, comprising:
   a rotor having a plurality of gear teeth;
   a first circumferential region around said rotor and a second circumferential region around said rotor defined by said first circumferential region, wherein said first circumferential region comprises a plurality of electrodes disposed opposite said gear teeth of said rotor and said second circumferential region comprises a circumferential gap; and
   a transmission gear in said circumferential gap for engagement with said rotor.

2. An electrostatic micro-motor apparatus as claimed in claim 1, wherein said electrodes are arranged at an interval of a first central angle and said teeth of said rotor are arranged at an interval of a second central angle such that said second central angle is a product of said first central angle by a natural number.

3. An electrostatic micro-motor apparatus as claimed in claim 1, wherein said second circumferential region comprises a plurality of circumferential gaps disposed symmetrically with respect to a rotational axis of said rotor.

4. An electrostatic micro-motor apparatus as claimed in claim 3, wherein a transmission gear is provided in each said circumferential gap, disposed symmetrically with respect to said rotational axis of said rotor.

5. An electrostatic micro-motor apparatus as claimed in claim 3, wherein the number of teeth of said transmission gear is less than the number of said teeth of said rotor.

6. An electrostatic micro-motor apparatus as claimed in claim 1, wherein the number of teeth of said transmission gear is less than the number of said teeth of said rotor.

* * * * *